(12) United States Patent
Bone et al.

(10) Patent No.: US 9,488,804 B2
(45) Date of Patent: Nov. 8, 2016

(54) OPTICAL IMAGING LENS

(71) Applicant: Genius Electronic Optical Co., Ltd., Taichung (TW)

(72) Inventors: Matthew Bone, Fremont, CA (US); Poche Lee, Taipei (TW); Tzu-Chien Tang, Taichung (TW)

(73) Assignee: Genius Electronic Optical Co., Ltd., Taichung (TW)

( * ) Notice: Subject to any disclaimer, the term of this patent is extended or adjusted under 35 U.S.C. 154(b) by 219 days.

(21) Appl. No.: 14/337,118

(22) Filed: Jul. 21, 2014

(65) Prior Publication Data

US 2015/0043091 A1    Feb. 12, 2015

Related U.S. Application Data

(60) Provisional application No. 61/863,881, filed on Aug. 8, 2013.

(51) Int. Cl.
*G02B 13/00* (2006.01)
*G02B 13/18* (2006.01)
*G02B 9/64* (2006.01)

(52) U.S. Cl.
CPC ............. *G02B 13/0045* (2013.01); *G02B 9/64* (2013.01); *G02B 13/18* (2013.01)

(58) Field of Classification Search
CPC .... G02B 13/0045; G02B 9/64; G02B 13/24; G02B 13/18
USPC .......................... 359/708, 755, 649; 348/335
See application file for complete search history.

(56) References Cited

U.S. PATENT DOCUMENTS 4,443,070 A * 4/1984 Fujioka ................ G02B 13/005
359/755

FOREIGN PATENT DOCUMENTS

| CN | 1148180 | | 4/1997 |
|---|---|---|---|
| JP | 63070818 A | * | 3/1988 |
| JP | 10161025 | | 6/1998 |
| JP | 10206731 | | 8/1998 |

OTHER PUBLICATIONS

Chinese Application No. 201410386123.3, First Office Action mailed Mar. 4, 2016, 9 pages.

* cited by examiner

*Primary Examiner* — Zachary Wilkes
(74) *Attorney, Agent, or Firm* — Kilpatrick Townsend & Stockton LLP

(57) ABSTRACT

An optical imaging lens includes, in order from an object side to an image side, first, second, third, fourth, fifth, sixth, and seventh lens elements arranged along an optical axis. The object-side surface of the first lens element has a convex portion and the image-side surface has a concave portion. The image-side of the third lens element is a concave surface. The object-side surface of the fourth lens element has a concave portion and the image-side surface of the fourth lens element has a convex portion. The image-side surface of the sixth lens element has a convex portion. The object-side surface of the seventh lens element has a convex portion and the image-side surface has a convex portion. The optical imaging lens only has seven lens elements having a refractive power.

17 Claims, 8 Drawing Sheets

OPTICAL IMAGING LENS

CROSS-REFERENCES TO RELATED APPLICATIONS

This application claims the benefit of U.S. Provisional Application No. 61/863,881, filed Aug. 8, 2013, the content of which is incorporated herein by reference in its entirety.

BACKGROUND

The present invention relates to an optical imaging lens, and more particularly to an optical imaging lens having seven lens elements.

The continuous need for high resolution imaging imposes demand in high light gathering capability in optical lens systems. As the number of pixels in an image sensor increases, an optical lens system for a camera having high optical performance is needed. Accordingly, the present invention provides optical lens systems with improved optical characteristics and high resolution.

SUMMARY

Certain embodiments of the present invention relate to an optical imaging lens having seven lens elements. In some embodiments, an optical imaging lens includes, in order from an object side to an image side, a first lens element, a second lens element, a third lens element, a fourth lens element, a fifth lens element, a sixth lens element, and a seventh lens element arranged along an optical axis. Each lens element has an object-side surface facing toward the object side and an image-side surface facing toward the image side. The object-side surface of the first lens element has a convex portion in a vicinity of the optical axis and the image-side surface has a concave portion in the vicinity of the optical axis. The second and fifth lens elements have a refractive power. The image-side surface of the third lens element has a concave portion in the vicinity of the optical axis and a concave portion in a vicinity of an outer circumference. The object-side surface of the fourth lens element has a concave portion in the vicinity of the optical axis and the image-side surface of the fourth lens element has a convex portion in the vicinity of the optical axis. The image-side surface of the sixth lens element has a convex portion in the vicinity of the optical axis. The object-side surface of the seventh lens element has a convex portion in the vicinity of the optical axis and the image-side surface of the seventh lens element has a convex portion in the vicinity of the optical axis. The optical imaging lens only has seven lens elements having a refractive power. Some or all of the lens elements can be made of plastic.

In another embodiment, an optical imaging lens includes, in order from an object side to an image side, a first lens element, a second lens element, a third lens element, an aperture stop, a fourth lens element, a fifth lens element, a sixth lens element, and a seventh lens element arranged along an optical axis. The object-side surface of the first lens element has a convex portion in a vicinity of the optical axis and a convex portion in a vicinity of an outer circumference. The second and fifth lens elements have a refractive power. The object-side surface of the third lens element has a convex portion in the vicinity of the optical axis and a convex portion in a vicinity of an outer circumference. The object-side surface of the fourth lens element has a concave portion in the vicinity of the optical axis. The image-side surface of the sixth lens element has a convex portion in a vicinity of the outer circumference. The object-side surface of the seventh lens element has a convex portion in the vicinity of the optical axis and the image-side surface has a convex portion in a vicinity of the outer circumference. The optical imaging lens only has seven lens elements having a refractive power. Some or all of the lens elements can be made of plastic.

In yet another embodiment, an optical imaging lens includes, in order from an object side to an image side, a first lens element, a second lens element, a third lens element, a fourth lens element, a fifth lens element, a sixth lens element, and a seventh lens element arranged along an optical axis. Each lens element has an object-side surface facing toward the object side and an image-side surface facing toward the image side. The object-side surface of the first lens element has a convex portion in a vicinity of an outer circumference and the image-side surface has a concave portion in a vicinity of the optical axis. The second and fifth lens elements have a refractive power. The object-side surface of the third lens element has a convex portion in the vicinity of the optical axis and the image-side surface of the third lens element has a concave portion in the vicinity of the optical axis. The fourth lens element has a positive refractive power and the object-side surface of the fourth lens element has a convex portion in the vicinity of the optical axis. The image-side surface of the sixth lens element has a convex portion in the vicinity of the optical axis and a convex portion in a vicinity of the outer circumference. The object-side surface of the seventh lens element has a convex portion in the vicinity of the optical axis and a convex portion in a vicinity of the outer circumference. The optical imaging lens only has seven lens elements having a refractive power. Some or all of the lens elements can be made of plastic.

The following description, together with the accompanying drawings, will provide a better understanding of the nature and advantages of the claimed invention.

DETAILED DESCRIPTION

It should be understood that the drawings are not drawn to scale, and similar reference numbers are used for representing similar elements. As used herein, the terms "example embodiment," "exemplary embodiment," and "present embodiment" do not necessarily refer to a single embodiment, although it may, and various example embodiments may be readily combined and interchanged, without departing from the scope or spirit of the present invention.

In the present specification, "a lens element having positive refracting power (or negative refracting power)" means that the lens element has positive refracting power (or negative refracting power) in the vicinity of the optical axis. "An object-side (or image-side) surface of a lens element comprises a convex (or concave) portion in a specific region" means that the object-side (or image-side) surface of the lens element "protrudes outwardly (or depresses inwardly)" along the direction parallel to the optical axis at the specific region, compared with the outer region radially adjacent to the specific region. The "effective diameter" (also sometimes referred to as "clear aperture diameter" or "clear aperture") of a lens element refers to the diameter of the portion of the surface of the lens element that is shaped to contribute to optical performance. For example, some or all lens elements may be formed with a flange or other structure at the outer periphery for mechanical purposes (e.g., positioning and retention of the lens element), and it is to be understood that such a structure would be outside the effective diameter. Further, in some instances, the object-side and image-side surfaces of a single lens element may have different effective diameters. In some instances, portions of the surface of a lens element may be specified as convex or concave. Such portions can be symmetric about the optical axis, with a portion that is "near," or "in the vicinity of," the optical axis extending outward from the optical axis and a portion "near," or "in the vicinity of," the periphery extending inward from the effective diameter. Those skilled in the art will understand that a portion of the surface described as being near the optical axis (or near the peripheral edge) may extend outward (or inward) sufficiently far to provide the desired optical properties.

Certain embodiments of the present invention relate to seven-element optical imaging lenses that gave broad applications in portable and wearable electronic devices, such as mobile phones, digital still cameras, digital video cameras, tablet PCs, and the like, that use a CCD or a CMOS imaging sensor. Lens data and other parameters of optical imaging lenses according to specific embodiments are described below. Those skilled in the art with access to the present disclosure will recognize that other optical imaging lenses can also be designed within the scope of the claimed invention.

First Embodiment

Figure 1:
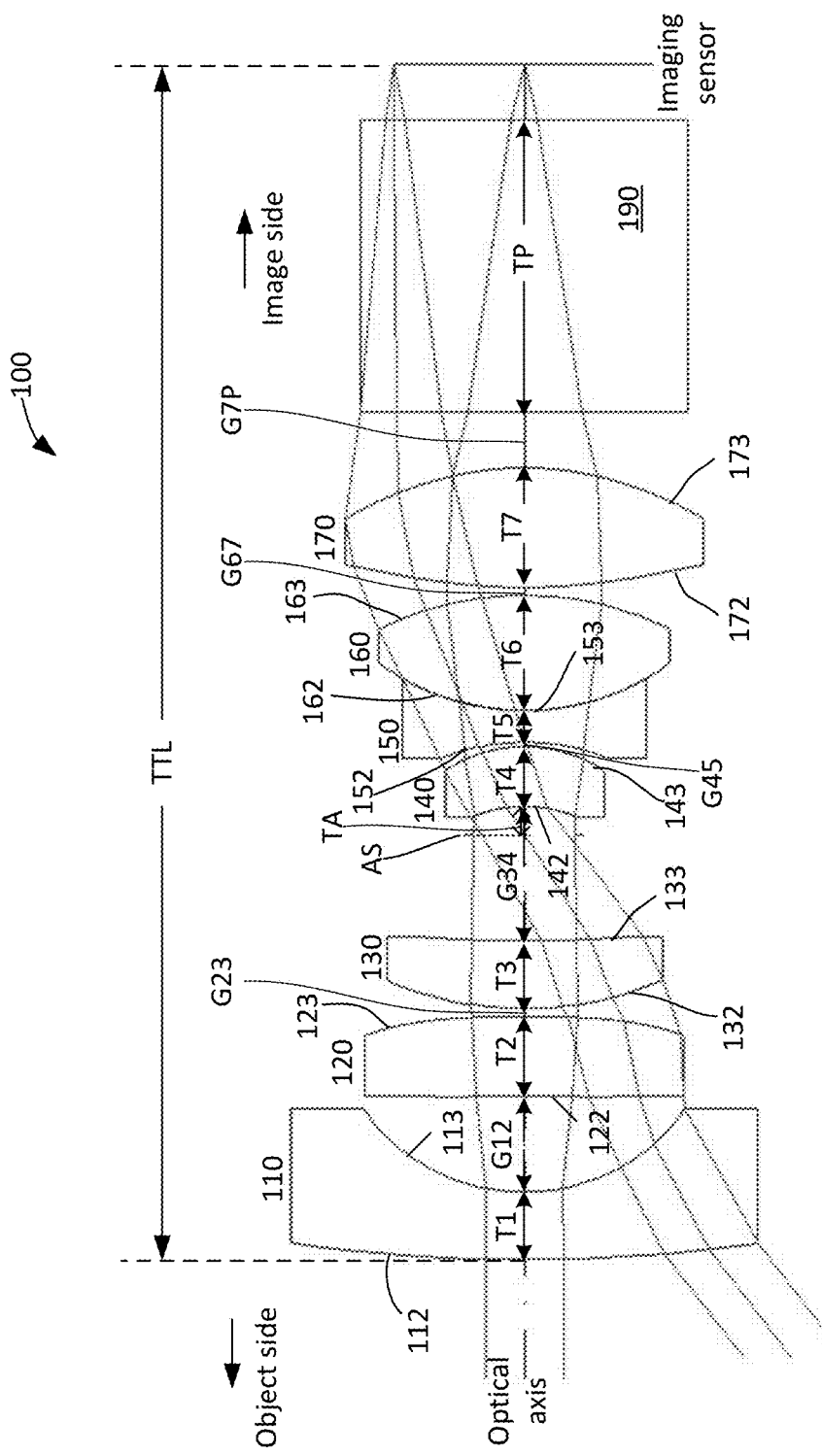
FIG. 1 is a cross-sectional of an optical imaging lens according to a first embodiment of the present invention.

FIG. 1 is a cross-sectional view of an imaging lens 100 according to a first embodiment of the present invention. Imaging lens 100 includes a first lens element 110, a second lens element 120, a third lens element 130, a fourth lens element 140, a fifth lens element 150, a sixth lens element 160, a seventh lens element 170, in this order from the object side along the optical axis. An optical aperture stop AS is disposed on the object side of fourth lens element 140. Specifically, aperture stop AS is disposed between third and fourth lens elements 130 and 140.

First lens element 110 has a convex surface 112 on the object side and a concave surface 113 on the image side. Second lens element 120 has a concave object-side surface 122 and a convex image-side surface 123. Third lens element 130 has a convex object-side surface 132 and a concave image-side surface 133. Lens element 140 has a concave object-side surface 142 and a convex image-side surface 143. Lens element 150 has a concave object-side surface 152 and a concave image-side surface 153. Lens element 160 is a double convex lens having a spherical convex surface 162 on the object side and a spherical convex surface 163 on the image side. Object-side surface 162 of lens element 160 has a surface area abutted to a surface area of image-side surface 153 of lens element 150. Lens element 170 has a convex object-side surface 172 and a convex surface 173 on the image side.

The lens elements 110 through 170 can be made of different materials. In some embodiments, the seven lens elements are made of plastics. In other embodiments, some of them may be made of glass. In a specific embodiment, lens elements 110, 150, and 160 are made of glass, while lens elements 120, 130, 140, and 170 are made of plastic. Other combinations are also possible. For instance, lens element 160 can be made of glass while lens elements 110, 120, 130, 140, 150, and 170 are made of plastic.

In some embodiments, lens 100 further includes a color separation prism 190. Color separation prism 190 may be of X-cube type or a Philips prism. Examples of suitable prisms are described in "Polarization Engineering for LCD Projection" by Michael D. Robinson, Gary Sharp, and Jianmin Chen which is incorporated by reference herein. US Publication 201300 63629A1 also provides description of prisms and is incorporated herein by reference.

Table 1 shows numeric lens data of imaging lens 100 according to an embodiment of the present invention.

TABLE 1

| surface | Surface type | Curvature radius (mm) | Thickness (T)/air gap (G) (mm) | Lens element | refractive index | Abbe number |
|---|---|---|---|---|---|---|
| 112 | spherical | 35.000 | T1 = 1.695 | 110 | 1.49 | 70.39 |
| 113 | spherical | 4.300 | G12 = 2.399 | | | |
| 122 | even aspheric | −90.467 | T2 = 2.000 | 120 | 1.54 | 58.11 |
| 123 | even aspheric | −34.566 | G23 = 0.200 | | | |
| 132 | spherical | 7.447 | T3 = 1.700 | 130 | 1.64 | 22.40 |
| 133 | even aspheric | 37.345 | G34 = 3.37 | | | |
| 142 | even aspheric | −2.969 | T4 = 1.500 | 140 | 1.54 | 56.11 |
| 143 | even aspheric | −3.100 | G45 = 0.113 | | | |
| 152 | spherical | −4.736 | T5 = 0.800 | 150 | 1.76 | 27.58 |
| 162 | spherical | 6.266 | T6 = 2.883 | 160 | 1.74 | 45.55 |
| 163 | spherical | −7.000 | G67 = 0.200 | | | |
| 172 | even aspheric | 12.082 | T7 = 3.000 | 170 | 1.54 | 56.11 |
| 173 | even aspheric | −6.580 | G7P = 1.420 | | | |
| 190 | spherical | | TP = 7.300 | | 1.52 | 64.17 |

Referring to FIG. 1 and Table 1, T1 is a thickness of first lens element 110 that is measured from the object-side surface at the optical axis to the image-side surface at the optical axis. Similarly, T2 is a thickness of second lens element 120 measured at the optical axis, T3 is a thickness of third lens element 130 measured at the optical axis, T4 is a thickness of fourth lens element 140 measured at the optical axis, T5 is a thickness of fifth lens element 150 measured at the optical axis, T6 is a thickness of sixth lens element 160 measured at the optical axis, T7 is a thickness of seventh lens element 170 measured at the optical axis, and TP is a thickness of prism 190 measured at the optical axis. G12 is an air gap between the image-side surface of first lens element 110 and the object-side surface of second lens element 120 along the optical axis, G23 is an air gap between the image-side surface of second lens element 120 and the object-side surface of third lens element 130 along the optical axis, G34 is an air gap between the image-side surface of third lens element 130 and the object-side surface of fourth lens element 140 along the optical axis, G45 is an air gap between the image-side surface of fourth lens element 140 and the object-side surface of fifth lens element 150 along the optical axis, and G67 is an air gap between the image-side surface of sixth lens element 160 and the object-side surface of seventh lens element 170 along the optical axis. Similarly, T7P is an air gap between the image-side surface of seventh lens element 170 and the object-side surface of prism 190 along the optical axis. TA is an air gap between aperture stop AS and the object-side surface of fourth lens element 140. No air gap exists between the fifth and sixth lens elements. TTL is a distance measured from the object-side surface of first lens element 110 to an object-side surface of an imaging sensor. These parameter names will be used for the following embodiments.

In an embodiment, the even aspheric surface of the lens elements can be expressed using the following expression:

$$Z(Y) = \frac{Y^2}{R} \bigg/ \left(1 + \sqrt{1 - (1+K)\frac{Y^2}{R^2}}\right) + \sum_{i=1}^{n} a_{2i} \times Y^{2i} \quad (1)$$

where Z(Y) is the depth of the aspheric surface of the lens element, R is the radius of curvature in millimeters (mm) from the optical axis to the lens surface, Y is the perpendicular distance between the point of the aspherical surface and the optical axis, K is a conic constant, and a(2i) is an aspheric surface coefficient of 2i-th level (or order term).

Table 2 shows numeric values of the aspheric lens elements.

TABLE 2

| Lens element | surface | Conic constant | 4-th order term | 6-th order term | 8-th order term |
|---|---|---|---|---|---|
| 120 | 122 | 0 | 1.24954E−03 | −6.20845E−05 | |
| | 123 | 0 | −1.51188E−03 | −7.00724E−06 | |
| 130 | 132 | | | | |
| | 133 | 0 | 1.69785E−03 | −2.03364E−04 | |
| 140 | 142 | 0 | −4.29982E−03 | −1.34771E−03 | |
| | 143 | 0 | −2.54400E−04 | −2.02557E−04 | |
| 170 | 172 | 0 | −4.22133E−04 | −5.68674E−06 | |
| | 173 | 0 | 6.49444E−04 | −3.98279E−06 | |

Table 3 shows the focal length (in mm) of the lens elements of the first embodiment.

TABLE 3

| | Lens element | | | | | | |
|---|---|---|---|---|---|---|---|
| | 110 | 120 | 130 | 140 | 150 | 160 | 170 |
| Focal length | −10.227 | 101.382 | 14.107 | 42.377 | −5.584 | 4.532 | 8.288 |
| Refractive power | negative | positive | positive | positive | negative | positive | positive |

In some embodiments, the effective focal length (EFL) of optical imaging lens 100 is 4.30 mm. The half field of view is 35.152 degrees. The F number is 2.4. The thickness of prismatic lens 190 is about 7.3 mm and the distance between prism 190 and an image plane is 1.42 mm. The distance between aperture stop AS and object-side surface 142 of lens element 140 is defined as TA and has a value of 0.714 mm. Air gap G34 is the sum of the distance between the image-side surface of the third lens element and the aperture stop and TA. The TTL (distance from the first lens element to the image plane on the optical axis) is 30 mm. The chief ray angle (CRA) is 0.67 degree.

Figure 5:
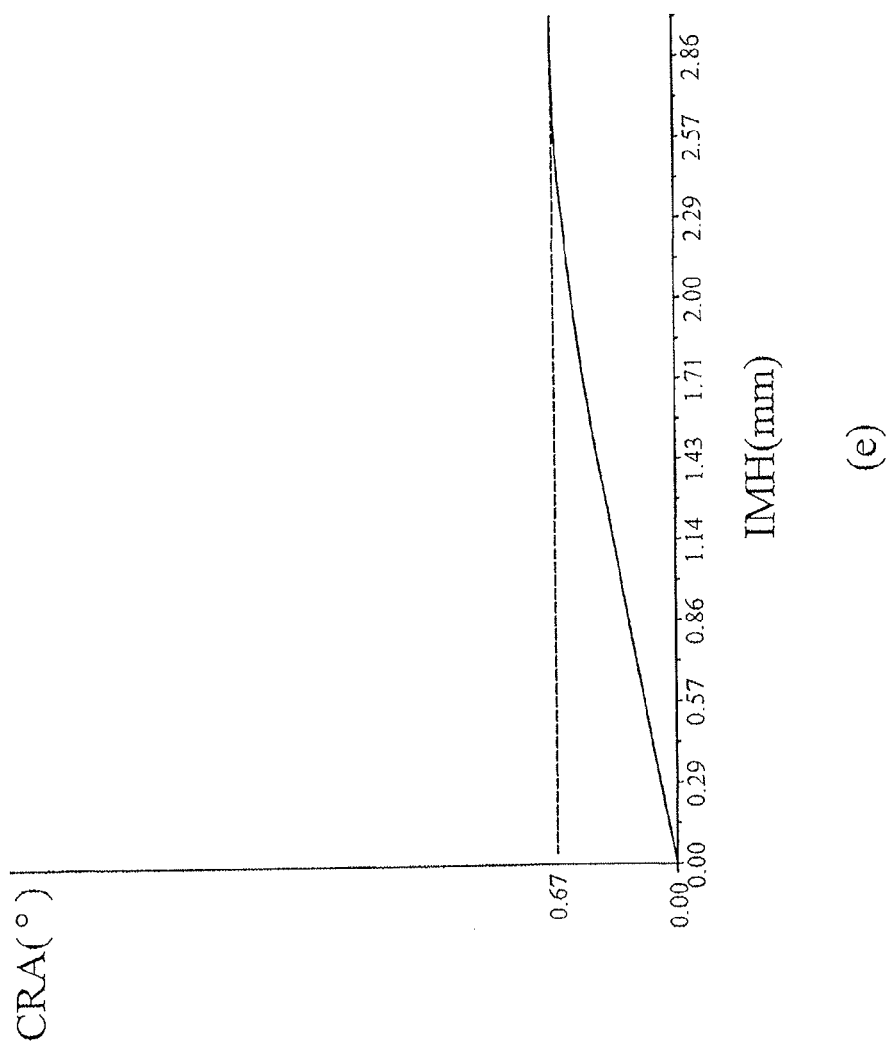
FIG. 5 shows optical characteristics of respective aberrations, astigmatic curves and distortions according to the first embodiment of the present invention.

FIG. 5 shows optical characteristics of respective aberrations, astigmatic curves, distortions, and chief ray angle according the first embodiment of the present invention.

Second Embodiment

Figure 2:
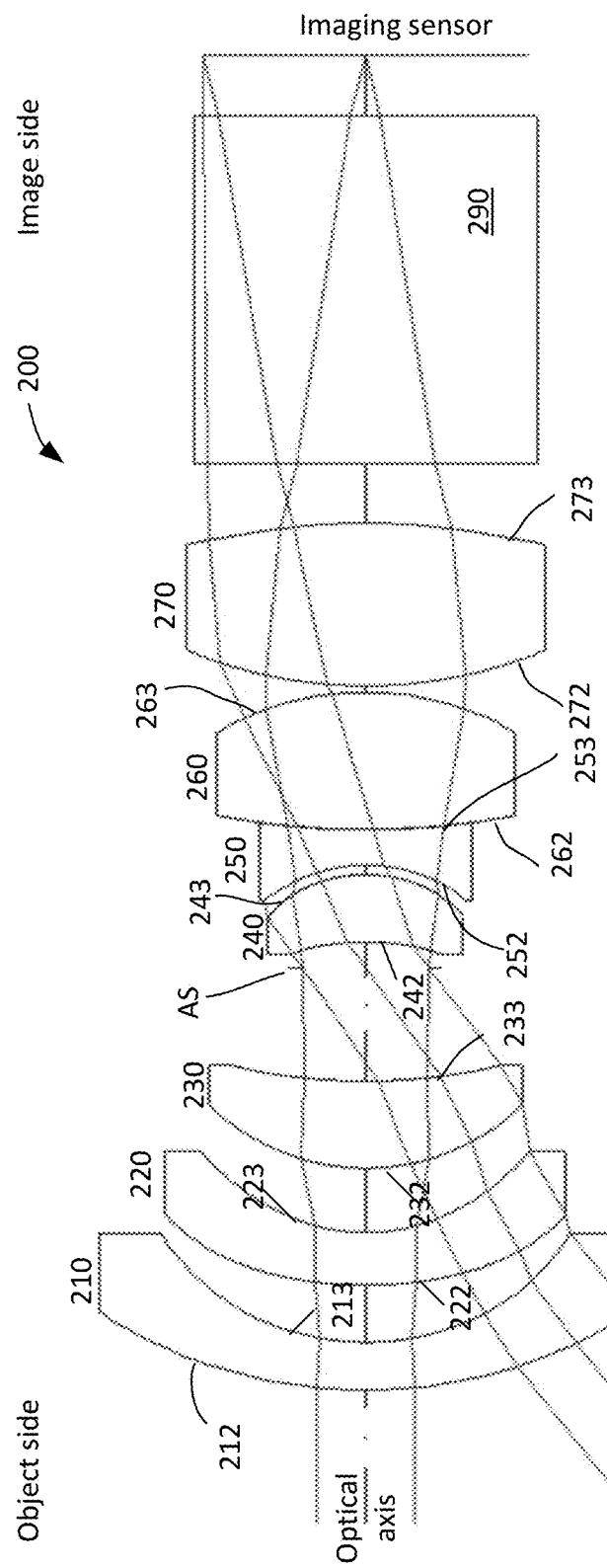
FIG. 2 is a cross-sectional of an optical imaging lens according to a second embodiment of the present invention.

FIG. 2 is a cross-sectional view of an imaging lens 200 according to a second embodiment of the present invention. Imaging lens 200 includes a first lens element 210, a second lens element 220, a third lens element 230, a fourth lens element 240, a fifth lens element 250, a sixth lens element 260, a seventh lens element 270, in this order from the object side along the optical axis. An optical aperture stop AS is disposed on the object side of lens element 240. Specifically, aperture stop AS is disposed between third and fourth lens elements 230 and 240.

First lens element 210 has a convex surface 212 on the object side and a concave surface 213 on the image side. Second lens element 220 has a convex object-side surface 222 and a concave image-side surface 223. Third lens element 230 has a convex object-side surface 232 and a concave image-side surface 233. Lens element 240 has a concave object-side surface 242 and a convex image-side surface 243. Lens element 250 has a concave object-side surface 252 and a concave image-side surface 253. Lens element 260 is a double convex lens having a convex surface 262 on the object side and a convex surface 263 on the image side. Object side surface 262 of lens element 260 has a surface area abutted to a surface area of image-side surface 253 of lens element 250. Lens element 270 has a convex object-side surface 272 and a convex surface 273 on the image side.

The lens elements can be made of different materials. In some embodiments, one or more of them may be made of glass. In a specific embodiment, lens elements 220, 230, 240, and 270 are made of plastic, and lens elements 210, 250, and 260 are made of glass. Other combinations are also possible. For instance, lens element 260 can be made of glass while lens elements 210, 220, 230, 240, 250, and 270 are made of plastic.

In some embodiments, lens 200 further includes a color separation prism 290, which can be similar to prism 190 described above.

Table 4 shows numeric lens data of imaging lens 200 according to an embodiment of the present invention.

TABLE 4

| surface | type | Curvature radius (mm) | Thickness (T)/air gap (G) (mm) | Lens element | refractive index | Abbe number |
|---|---|---|---|---|---|---|
| 212 | spherical | 8.180 | T1 = 1.000 | 210 | 1.77 | 49.6 |
| 213 | spherical | 4.258 | G12 = 1.197 | | | |
| 222 | even aspheric | 6.904 | T2 = 1.100 | 220 | 1.54 | 56.1 |
| 223 | even aspheric | 42.947 | G23 = 1.351 | | | |
| 232 | even aspheric | 3.555 | T3 = 1.830 | 230 | 1.64 | 22.4 |
| 233 | even aspheric | 10.680 | G34 = 2.912 | | | |

TABLE 4-continued

| surface | type | Curvature radius (mm) | Thickness (T)/air gap (G) (mm) | Lens element | refractive index | Abbe number |
|---|---|---|---|---|---|---|
| 242 | even aspheric | −4.947 | T4 = 1.416 | 240 | 1.54 | 56.1 |
| 243 | even aspheric | −2.443 | G45 = 0.200 | | | |
| 252 | spherical | −2.725 | T5 = 0.750 | 250 | 1.76 | 27.6 |
| 262 | spherical | 13.425 | T6 = 2.880 | 260 | 1.62 | 58.0 |
| 263 | spherical | −4.922 | G67 = 0.132 | | | |
| 272 | even aspheric | 7.570 | T7 = 3.416 | 270 | 1.54 | 56.1 |
| 273 | even aspheric | −9.943 | G7P = 1.256 | | | |
| 290 | spherical | | TP = 7.300 | prism | 1.52 | 64.2 |

Table 5 shows numeric values of the aspheric lens elements of the second embodiment. These values can be used in combination with Equation (1) above to characterize the aspheric surfaces.

TABLE 5

| Lens element | surface | Conic constant | 4-th order term | 6-th order term | 8-th order term |
|---|---|---|---|---|---|
| 220 | 222 | 1.62098E+00 | 8.48289E−04 | 1.11131E−06 | |
| | 223 | −5.43927E−01 | −1.81860E−03 | 5.32296E−05 | |
| 230 | 232 | −9.09668E−02 | −1.48850E−03 | 2.33504E−05 | |
| | 233 | −1.01600E+01 | 2.46391E−03 | −9.64887E−05 | |
| 240 | 242 | 9.15929E+00 | 2.06556E−04 | −2.37979E−04 | 0 |
| | 243 | 4.67665E−01 | 1.32479E−03 | 2.36189E−04 | 0 |
| 270 | 272 | −5.07756E−01 | 6.09907E−05 | 4.38378E−06 | 0 |
| | 273 | −5.07756E−01 | 6.09907E−05 | 4.38378E−06 | 0 |

Table 6 shows the focal length (in mm) of the lens elements of the second embodiment.

TABLE 6

| | Lens element | | | | | | |
|---|---|---|---|---|---|---|---|
| | 210 | 220 | 230 | 240 | 250 | 260 | 270 |
| Focal length | −12.914 | −10.464 | 7.505 | 7.388 | −2.807 | 6.932 | 8.470 |
| Refractive power | negative | negative | positive | positive | negative | positive | positive |

In some embodiments, the effective focal length of optical imaging lens 200 is 4.30 mm. The half field of view is 34.83 degrees. The F number is 2.4. The thickness of prismatic lens 290 is about 7.3 mm and the distance between prism 290 and an image plane is 1.26 mm. The distance between the aperture stop AS and object side 242 of lens element 240 is 0.543 mm. The TTL (distance from the first lens element to the image plane on the optical axis) is 28 mm. The chief ray angle (CRA) is 1.03 degrees.

Figure 6:
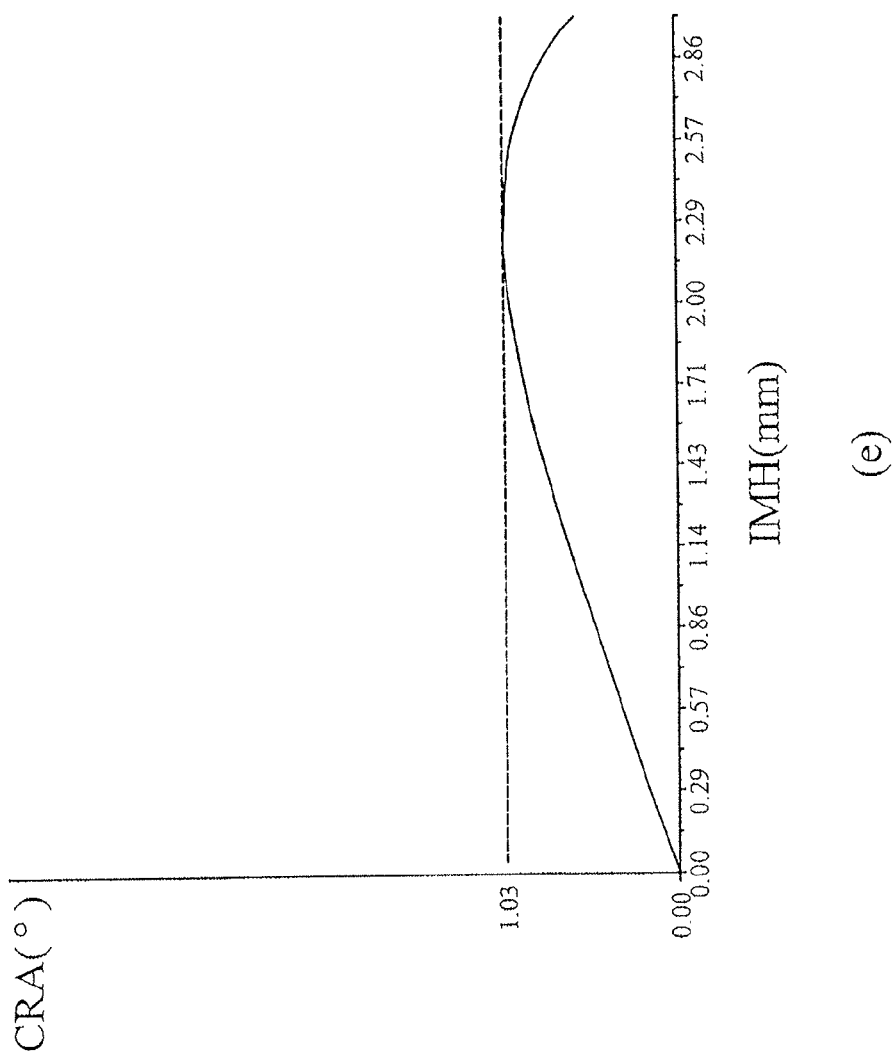
FIG. 6 shows optical characteristics of respective aberrations, astigmatic curves and distortions according to the second embodiment of the present invention.

FIG. 6 shows optical characteristics of respective aberrations, astigmatic curves, distortions, and chief ray angle according the second embodiment of the present invention.

Third Embodiment

Figure 3:
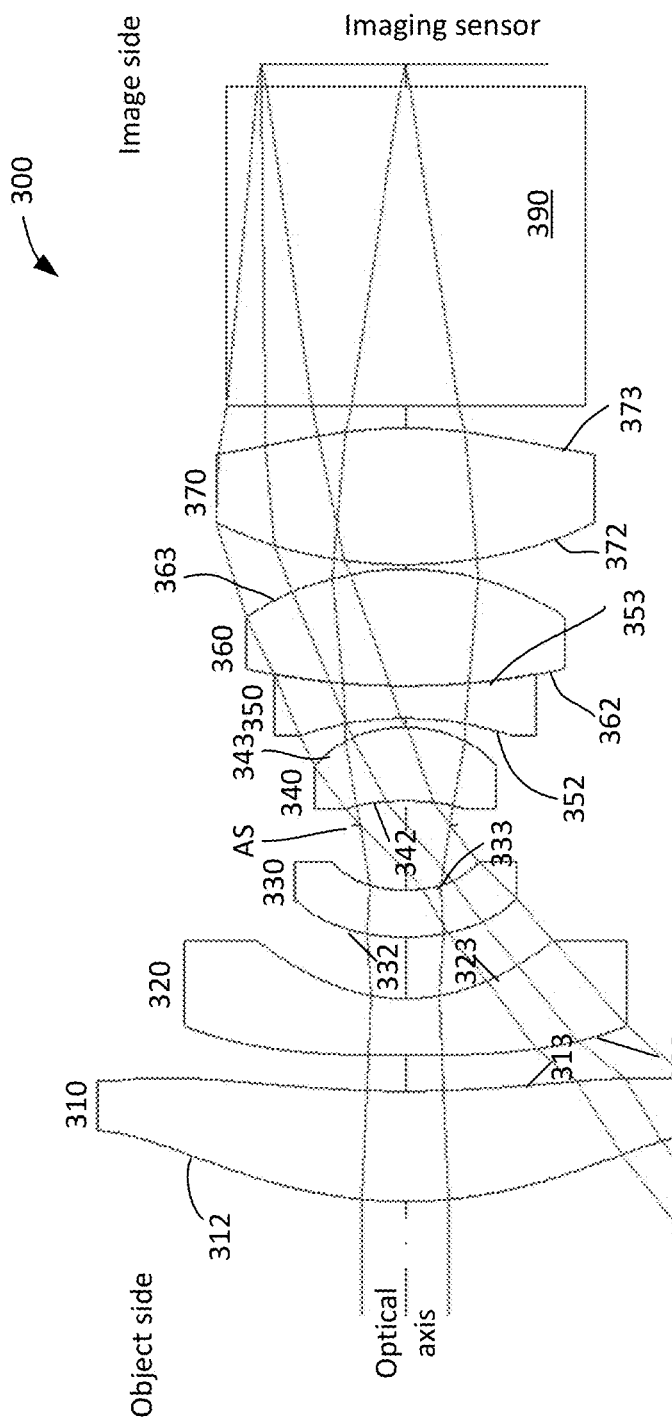
FIG. 3 is a cross-sectional of an optical imaging lens according to a third embodiment of the present invention.

FIG. 3 is a cross-sectional view of an imaging lens 300 according to a third embodiment of the present invention. Imaging lens 300 includes a first lens element 310, a second lens element 320, a third lens element 330, a fourth lens element 340, a fifth lens element 350, a sixth lens element 360, a seventh lens element 370, in this order from the object side along the optical axis. An optical aperture stop AS is disposed on the object side of lens element 340. Specifically, aperture stop AS is disposed between second and third lens elements 330 and 340.

First lens element 310 has an even aspheric convex surface 312 on the object side and an even aspheric surface 313 on the image side which has a concave portion in a vicinity of the optical axis and a convex portion in a vicinity of the periphery of the image side. Second lens element 320 has a convex object-side surface 322 and a concave image-side surface 323. Third lens element 330 has an even aspheric convex object-side surface 332 and an even aspheric concave image-side surface 333. Lens element 340 has an even aspheric concave object-side surface 342 and an even aspheric convex image-side surface 343. Lens element 350 has a spherical concave object side surface 352 and a spherical concave image-side surface 353. Lens element 360 is a double convex lens having a spherical convex surface 362 on the object side and a spherical convex surface 363 on the image side. Object side surface 362 of lens element 360 has a surface area abutted to a surface area of image side surface 353 of lens element 350. Lens element 370 has an even aspheric object-side convex surface 372 and an even aspheric convex surface 373 on the image side.

The lens elements can be made of different materials. In some embodiments, one or more of them may be made of glasses, and some of them are made of plastic. In a specific embodiment, lens elements 310, 320, 330, 340, and 370 are made of plastic, and lens elements 350 and 360 are made of glass. Other combinations are also possible. For instance, lens element 360 can be made of glass while lens elements 310, 320, 330, 340, 350, and 370 are made of plastic.

In an embodiment, lens 300 further includes a color separation prism 390, which can be similar to prism 190 described above.

Table 7 shows numeric lens data of imaging lens 300 according to an embodiment of the present invention.

TABLE 7

| surface | type | Curvature radius (mm) | Thickness (T)/air gap (G) (mm) | Lens element | refractive index | Abbe number |
|---|---|---|---|---|---|---|
| 312 | even aspheric | 8.741 | T1 = 2.523 | 310 | 1.64 | 22.4 |
| 313 | even aspheric | 22.240 | G12 = 0.816 | | | |
| 322 | even aspheric | 12.276 | T2 = 1.293 | 320 | 1.54 | 56.1 |
| 323 | even aspheric | 3.600 | G23 = 1.406 | | | |
| 332 | even aspheric | 4.168 | T3 = 1.076 | 330 | 1.64 | 22.4 |
| 333 | even aspheric | 2.650 | G34 = 2.036 | | | |
| 342 | even aspheric | −5.367 | T4 = 1.681 | 340 | 1.54 | 56.1 |
| 343 | even aspheric | −2.700 | G45 = 0.200 | | | |
| 352 | spherical | −6.534 | T5 = 0.750 | 350 | 1.76 | 27.6 |
| 362 | spherical | 14.206 | T6 = 2.658 | 360 | 1.62 | 58.0 |
| 363 | spherical | −5.620 | G67 = 0.113 | | | |
| 372 | even aspheric | 9.000 | T7 = 3.112 | 370 | 1.54 | 56.1 |
| 373 | even aspheric | −8.395 | G7P = 0.510 | | | |
| 390 | spherical | | TP = 7.300 | prism | 1.52 | 64.2 |

Table 8 shows numeric values of the aspheric lens elements of the third embodiment. These values can be used in combination with Equation (1) above to characterize the aspheric surfaces.

TABLE 8

| Lens element | surface | Conic constant | 4-th order term | 6-th order term | 8-th order term |
|---|---|---|---|---|---|
| 310 | 312 | 0.0000E+00 | −1.83080E−04 | −1.25052E−05 | 0.0000E+00 |
|  | 313 | 0.0000E+00 | −3.93945E−04 | −1.63229E−06 | 0.0000E+00 |
| 320 | 322 | 0.0000E+00 | 1.83645E−03 | −5.93805E−05 | 1.07937E−06 |
|  | 323 | −5.09863E−01 | −7.65193E−04 | −1.00446E−04 | 0.0000E+00 |
| 330 | 332 | 1.55727E+00 | −7.52302E−04 | 1.13534E−04 | 0.0000E+00 |
|  | 333 | 1.56064E+00 | 5.33526E−03 | −8.31446E−05 | 0.0000E+00 |
| 340 | 342 | 9.15929E+00 | −4.62017E−03 | −2.08676E−04 | 0.0000E+00 |
|  | 343 | 4.67665E−01 | −9.30867E−04 | 3.46627E−05 | 0.0000E+00 |
| 370 | 372 | −1.40784E+00 | 3.39106E−04 | 8.89914E−06 | 0.0000E+00 |
|  | 373 | 0.00000E+00 | 1.77979E−03 | −1.18477E−05 | 0.0000E+00 |

Table 9 shows the focal length (in mm) of the lens elements of the third embodiment.

TABLE 9

| | Lens element | | | | | | |
|---|---|---|---|---|---|---|---|
| | 310 | 320 | 330 | 340 | 350 | 360 | 370 |
| Focal length | 20.804 | −7.122 | −15.622 | 8.157 | −5.819 | 6.805 | 8.508 |
| Refractive power | positive | negative | negative | positive | negative | positive | positive |

In some embodiments, the effective focal length of optical imaging lens 300 is 4.30 mm. The half field of view is 35.08 degrees. The F number is 2.4. The thickness of the prismatic lens 390 is about 7.3 mm and the distance between prism 390 and an image plane is 0.514 mm. The distance between the aperture stop AS and object side surface 342 on the optical axis is 0.543 mm. The TTL (distance from the first lens element to the image plane on the optical axis) is 25.99 mm. The chief ray angle (CRA) is 0.83 degrees.

Figure 7:
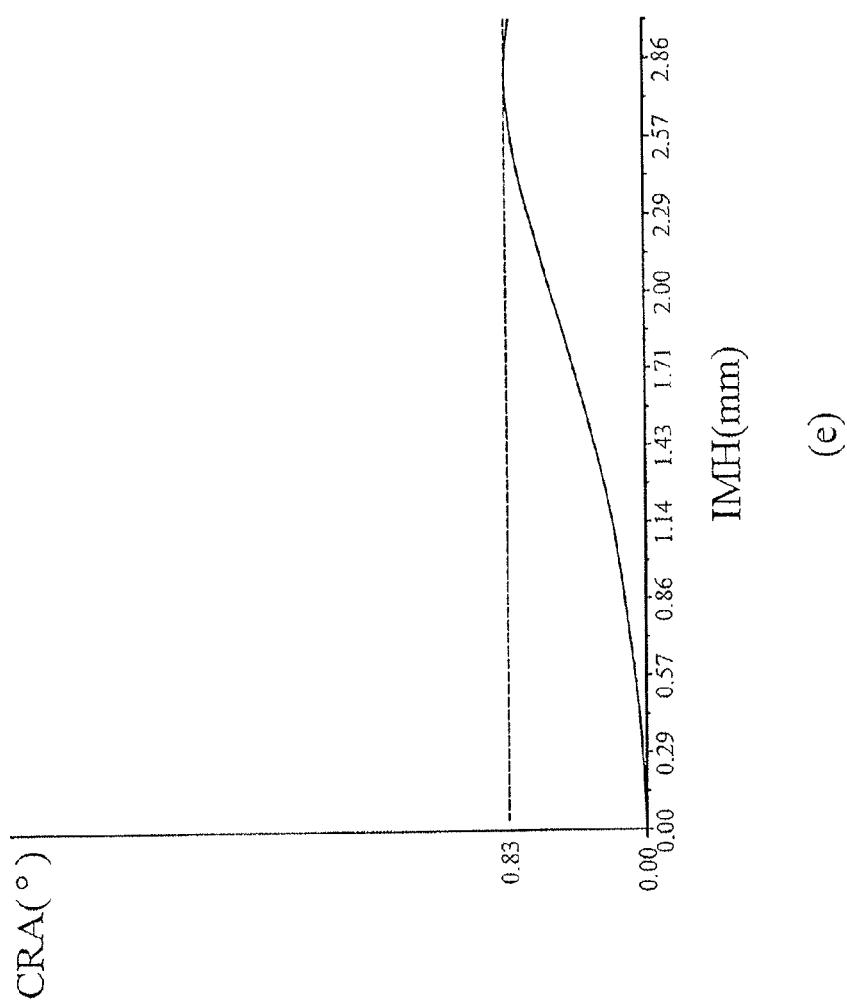
FIG. 7 shows optical characteristics of respective aberrations, astigmatic curves and distortions according to the third embodiment of the present invention.

FIG. 7 shows optical characteristics of respective aberrations, astigmatic curves. Distortions and chief ray angle according the third embodiment of the present invention.

Fourth Embodiment

Figure 4:
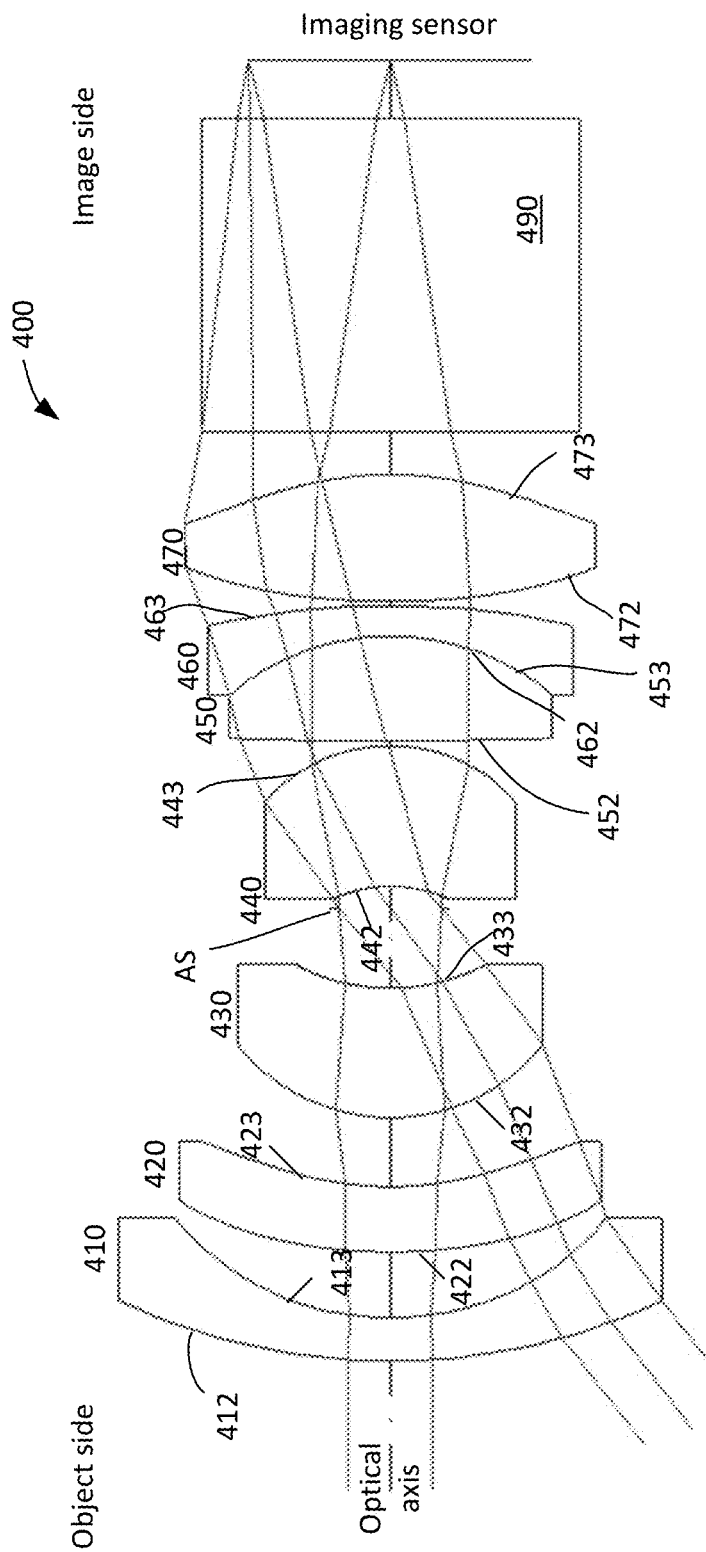
FIG. 4 is a cross-sectional of an optical imaging lens according to a fourth embodiment of the present invention.

FIG. 4 is a cross-sectional view of an imaging lens 400 according to a third embodiment of the present invention. Imaging lens 400 includes a first lens element 410, a second lens element 420, a third lens element 430, a fourth lens element 440, a fifth lens element 450, a sixth lens element 460, a seventh lens element 470, in this order from the object side along the optical axis. An optical aperture stop AS is disposed on the object side of lens element 440. Specifically, aperture stop AS is disposed between third and fourth lens elements 430 and 440.

First lens element 410 has a spherical convex surface 412 on the object side and a spherical concave surface 413 on the image side. Second lens element 420 has an even aspheric convex object-side surface 422 and an even aspheric concave image-side surface 423 on the optical axis. Third lens element 430 has an even aspheric convex object-side surface 432 and an even aspheric concave image-side surface 433. Lens element 440 has an even aspheric concave object-side surface 442 and an even aspheric convex image-side surface 443. Lens element 450 has a spherical convex object-side surface 452 and a spherical convex image-side surface 453. Lens element 460 has a spherical concave surface 462 on the object side and a spherical convex surface 463 on the image side. Object side surface 462 of lens element 460 has a surface area abutted to a surface area of image-side surface 453 of lens element 450. Lens element 470 has an even aspheric convex object-side surface 472 and an even aspheric convex surface 473 on the image side.

The lens elements can be made of different materials. In some embodiments, one or more of them may be made of glasses, and some of them are made of plastic. In a specific embodiment, lens elements 420, 430, 440, and 470 are made of plastic, and lens elements 410, 450 and 460 are made of glass. Other combinations are also possible. For instance, lens element 460 can be made of glass while lens elements 410, 420, 430, 440, 450, and 470 are made of plastic.

In an embodiment, lens 400 further includes a color separation prism 490, which can be similar to prism 190 described above.

Table 10 shows numeric lens data of imaging lens 400 according to an embodiment of the present invention.

TABLE 10

| surface | type | Curvature radius (mm) | Thickness (T)/air gap (G) (mm) | Lens element | refractive index | Abbe number |
|---|---|---|---|---|---|---|
| 412 | spherical | 12.550 | T1 = 1.000 | 410 | 1.77 | 49.6 |
| 413 | spherical | 5.702 | G12 = 1.515 | | | |
| 422 | even aspheric | 11.332 | T2 = 1.500 | 420 | 1.54 | 56.1 |
| 423 | even aspheric | 6.163 | G23 = 1.593 | | | |
| 432 | even aspheric | 3.735 | T3 = 2.989 | 430 | 1.61 | 26.6 |
| 433 | even aspheric | 4.295 | G34 = 2.341 | | | |
| 442 | spherical | −2.956 | T4 = 3.246 | 440 | 1.54 | 56.1 |
| 443 | spherical | −3.348 | G45 = 0.113 | | | |
| 452 | spherical | 96.813 | T5 = 2.415 | 450 | 1.76 | 27.6 |
| 462 | spherical | −5.000 | T6 = 0.700 | 460 | 1.62 | 58.0 |
| 463 | spherical | −16.862 | G67 = 0.100 | | | |
| 472 | even aspheric | 15.099 | T7 = 2.931 | 470 | 1.54 | 56.1 |
| 473 | even aspheric | −6.726 | G7P = 1.000 | | | |
| 490 | spherical | | TP = 7.210 | 490 | 1.51 | 64.2 |

Table 11 shows numeric values of the aspheric lens elements of the fourth embodiment. These values can be used in combination with Equation (1) above to characterize the aspheric surfaces.

TABLE 11

| Lens element | surface | Conic constant | 4-th order term | 6-th order term | 8-th order term |
|---|---|---|---|---|---|
| 420 | 422 | 0 | 6.44569E−04 | | 0 |
| | 423 | 0 | −1.67906E−03 | 0.0000E+00 | 0.0000E+00 |
| 430 | 432 | 0 | −1.17536E−03 | −3.46656E−05 | 0 |
| | 433 | −9.99744E−01 | 4.63997E−03 | 0 | 0 |
| 440 | 442 | 0 | −6.43192E−03 | −2.51770E−03 | 0 |
| | 443 | 4.59372E−02 | 4.78847E−04 | 0.0000E+00 | 0 |
| 470 | 472 | 4.50005E+00 | 2.03104E−04 | 7.27373E−07 | 0 |
| | 473 | −8.04067E−01 | 6.62485E−04 | 9.84163E−06 | 0 |

Table 12 shows the focal length (in mm) of the lens elements of the fourth embodiment.

TABLE 12

| | Lens element | | | | | | |
|---|---|---|---|---|---|---|---|
| | 410 | 420 | 430 | 440 | 450 | 460 | 470 |
| Focal length | −14.397 | −27.577 | 15.485 | 24.048 | 32.288 | −8.564 | 8.948 |
| Refractive power | negative | negative | positive | positive | positive | negative | positive |

In some embodiments, the effective focal length of optical imaging lens 400 is 4.30 mm. The half field of view is 35.17 degrees. The F number is 2.4. The thickness of the prismatic lens 490 is about 7.21 mm and the distance between prism 190 and an image plane is 1.348 mm. The distance between the aperture stop AS and object side surface 142 is 0.500 mm. The TTL (distance from the first lens element to the image plane on the optical axis) is 30 mm. The chief ray angle (CRA) is 0.82 degrees.

Figure 8:
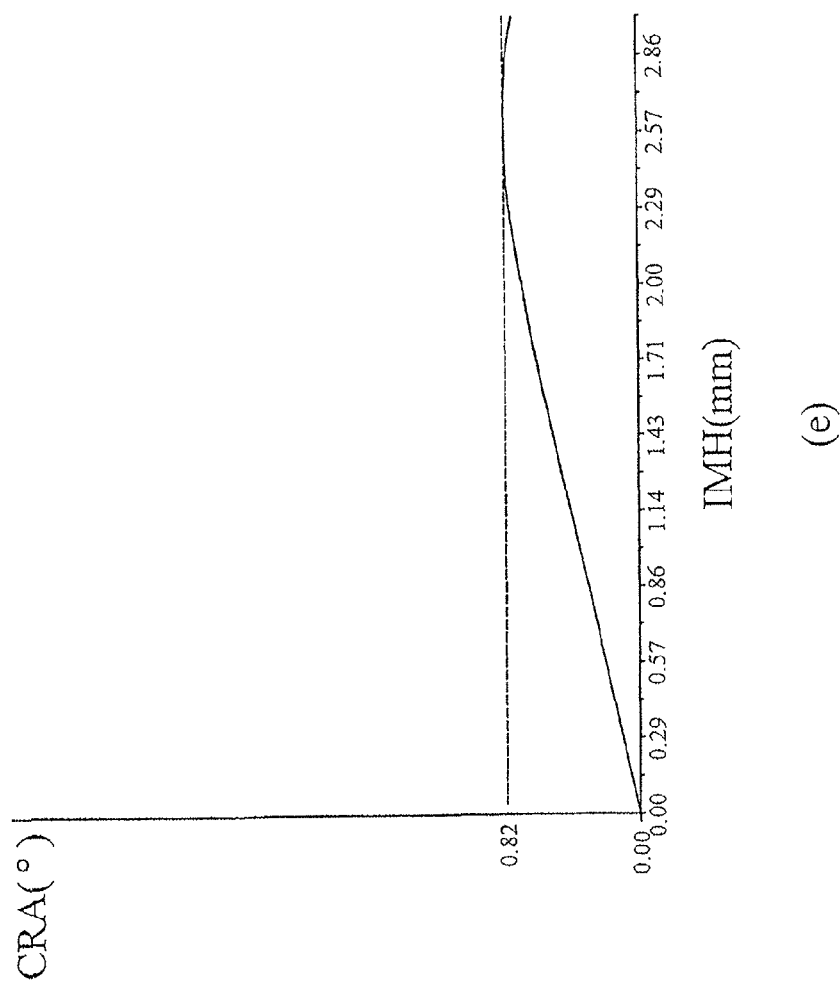
FIG. 8 shows optical characteristics of respective aberrations, astigmatic curves and distortions according to the fourth embodiment of the present invention.

FIG. 8 shows optical characteristics of respective aberrations, astigmatic curves. Distortions and chief ray angle according to the fourth embodiment of the present invention.

Table 13 summarizes various characteristics of the surface design of specific lens elements for optical imaging lenses 100 through 400.

TABLE 13

| | | Lens 100 | Lens 200 | Lens 300 | Lens 400 |
|---|---|---|---|---|---|
| Object side surface of first lens element | Shape of center/ periphery area | convex/ convex | convex/ convex | convex/ convex | convex/ convex |
| Image side surface of first lens element | Shape of center/ periphery area | concave/ concave | concave/ concave | concave/ convex | concave/ concave |
| Object side surface of second lens element | Shape of center/ periphery area | concave/ concave | convex/ convex | convex/ convex | convex/ convex |
| Image side surface of second element | Shape of center/ periphery area | convex/ convex | concave/ concave | concave/ concave | concave/ concave |
| Object side surface of third element | Shape of center/ periphery area | convex/ convex | convex/ convex | convex/ convex | convex/ convex |
| Image side surface of third lens element | Shape of center/ periphery area | concave/ concave | concave/ concave | concave/ concave | concave/ concave |
| Object side surface of fourth element | Shape of center/ periphery area | concave/ concave | concave/ concave | concave/ concave | concave/ concave |
| Image side surface of fourth lens element | Shape of center/ periphery area | convex/ convex | convex/ convex | convex/ convex | convex/ convex |
| Object side surface of fiftth element | Shape of center/ periphery area | concave/ concave | concave/ concave | concave/ concave | convex/ convex |
| Image side surface of fifth lens element | Shape of center/ periphery area | concave/ concave | concave/ concave | concave/ concave | convex/ convex |
| Object side surface of sixth element | Shape of center/ periphery area | convex/ convex | convex/ convex | convex/ convex | concave/ concave |
| Image side surface of sixth lens element | Shape of center/ periphery area | convex/ convex | convex/ convex | convex/ convex | convex/ convex |
| Object side surface of seventh lens element | Shape of center/ periphery area | convex/ convex | convex/ convex | convex/ convex | convex/ convex |
| Image side surface of seventh lens element | Shape of center/ periphery area | convex/ convex | convex/ convex | convex/ convex | convex/ convex |

In some embodiments, the aperture stop AS is disposed between the third and the fourth lens elements to obtain a wide field of view angle and improve the optical imaging lens performance. The optical imaging lens only has seven lens elements that have a refractive power. The effective focal length can be 4.30 mm. As shown above, a color separation prism can be disposed between the seventh lens element and the imaging sensor and can have a thickness of 7.3 mm.

In embodiments described herein, the ratio of EFL/T7 is between 0.5 and 3.0. EFL is the effective focal length and T7 is the thickness of the seventh lens element along the optical axis. The ratio of ALT/EFL is between 0.5 and 6.0. ALT is the total thickness of the first to the seventh lens elements along the optical axis. The ratio of AAG/G34 is between 0.5 and 6.0. AAG is the sum of air gaps between the first lens element through the seventh lens element along the optical axis. G34 is the air gap between the third and fourth lens elements. The ratio of ALT/AAG is between 1.0 and 5.0. The ratio of AAG/EFL is between 0.1 and 3.5.

In embodiments described herein, the ratio of T2/T4 is between 0.05 and 2.0. T2 and T4 are the respective thickness of the second and fourth lens elements along the optical axis. The ratio of G34/G45 is between 5.0 and 30. G34 and G45 are the air gap between the third and fourth lens elements and the air gap between the fourth and fifth lens elements along the optical axis, respectively. The ratio of T1/T2 is between 0.3 and 2.5. T1 is the thickness of the first lens element along the optical axis. The ratio of EFL/G12 is between 0.3 and 10.0. G12 is the air gap between the first and second lens elements along the optical axis. The ratio of T1/G67 is between 5.0 and 30.0. G67 is the air gap between the sixth and seventh lens elements. The ratio of T3/T7 is between 0.05 and 1.5. T3 is the thickness of the third lens element along the optical axis.

In embodiments described herein, the ratio of G23/G34 is between 0.01 and 1.20. G23 is the air gap between the second and third lens elements. The ratio of T2/G23 is between 0.1 and 15.0. The ratio of T5/T6 is between 0.01 and 4.0. T5 and T6 are the respective thickness of the fifth and sixth lens elements along the optical axis. The ratio of G23/G67 is between 0.5 and 25.0. The ratio of G12/G23 is between 0.1 and 20.0. The ratio of T6/G23 is between 0.1 and 25.0.

Table 14 summarizes data relating to the four above-described embodiments.

TABLE 14

| ratio | 1st embod. | 2nd embod. | 3rd embod. | 4th embod. | Lower limit | Upper limit |
|---|---|---|---|---|---|---|
| EFL/T7 | 1.433 | 1.259 | 1.382 | 1.467 | 0.500 | 3.000 |
| ALT/EFL | 3.158 | 2.882 | 3.045 | 3.437 | 0.500 | 6.000 |
| AAG/G34 | 1.864 | 1.989 | 2.245 | 2.419 | 0.500 | 6.000 |
| ALT/AAG | 2.161 | 2.139 | 2.864 | 2.611 | 1.000 | 5.000 |
| AAG/EFL | 1.461 | 1.347 | 1.063 | 1.317 | 0.100 | 3.500 |
| T2/T4 | 1.333 | 0.777 | 0.769 | 0.462 | 0.050 | 2.000 |
| G34/G45 | 29.709 | 14.562 | 10.184 | 20.760 | 5.000 | 30.000 |
| T1/T2 | 0.848 | 0.909 | 1.952 | 0.667 | 0.300 | 2.500 |
| EFL/G12 | 1.792 | 3.591 | 5.269 | 2.838 | 0.300 | 10.000 |
| T1/G67 | 8.475 | 7.588 | 22.320 | 10.000 | 5.000 | 30.000 |
| T3/T7 | 0.567 | 0.536 | 0.346 | 1.020 | 0.050 | 1.500 |
| G23/G34 | 0.059 | 0.464 | 0.690 | 0.680 | 0.010 | 1.200 |
| T2/G23 | 10.000 | 0.814 | 0.919 | 0.942 | 0.100 | 15.000 |
| T5/T6 | 0.277 | 0.260 | 0.282 | 3.450 | 0.010 | 4.000 |
| G23/G67 | 1.000 | 10.252 | 12.439 | 15.926 | 0.500 | 25.000 |
| G12/G23 | 11.995 | 0.886 | 0.580 | 0.952 | 0.100 | 20.000 |
| T6/G23 | 14.417 | 2.132 | 1.890 | 0.440 | 0.100 | 25.000 |

The present invention is not limited to the above-described embodiments. The invention is intended to cover all modifications and equivalents within the scope of the appended claims.

What is claimed is:

1. An optical imaging lens comprising, in order from an object side to an image side, a first lens element, a second lens element, a third lens element, a fourth lens element, a fifth lens element, a sixth lens element, and a seventh lens element arranged along an optical axis, each lens element having an object-side surface facing toward the object side and an image-side surface facing toward the image side, wherein:

the object-side surface of the first lens element has a convex portion in a vicinity of the optical axis and the image-side surface has an concave portion in the vicinity of the optical axis;

the second and fifth lens elements have a refractive power;

the image-side surface of the third lens element has a concave portion in the vicinity of the optical axis and an concave portion in the vicinity of an outer circumference;

the object-side surface of the fourth lens element has a concave portion in the vicinity of the optical axis and the image-side surface has a convex portion in the vicinity of the optical axis;

the image-side surface of the sixth lens element has a convex portion in the vicinity of the optical axis;

the object-side surface of the seventh lens element has a convex portion in the vicinity of the optical axis and image-side surface has a convex portion in the vicinity of the outer circumference;

the optical imaging lens only has seven lens elements having a refractive power; and an effective focal length of the optical imaging lens is defined as EFL, a thickness of the seventh lens element along the optical axis is defined as T7, and EFL and T7 satisfy the relation:

$EFL/T7 \leq 3$.

2. The optical imaging lens of claim 1, wherein an air gap between the second and third lens elements along the optical axis is defined as G23 and an air gap between the third and fourth lens elements along the optical axis is defined as G34, and wherein G23 and G34 satisfy the relation:

$G23/G34 \leq 1.2$.

3. The optical imaging lens of claim 1, wherein a thickness of the second lens element along the optical axis is defined as T2 and an air gap between the second and third lens elements along the optical axis is defined as G23, and wherein T2 and G23 satisfy the relation:

$T2/G23 \leq 15$.

4. The optical imaging lens of claim 1, wherein a thickness of the second lens element along the optical axis is defined as T2 and a thickness of the fourth lens element along the optical axis is defined as T4, and wherein T2 and T4 satisfy the relation:

$T2/T4 \leq 2.0$.

5. The optical imaging lens of claim 1, wherein an air gap between the third and fourth lens elements along the optical axis is defined as G34 and an air gap between the fourth and fifth lens elements along the optical axis is defined as G45, and wherein G34 and G45 satisfy the relation:

$G34/G45 \leq 30$.

6. The optical imaging lens of claim 1, wherein a sum of thicknesses of the first, second, third, fourth, fifth, sixth, and seventh lens elements along the optical axis is defined as ALT, and wherein ALT and EFL satisfy the relation:

$ALT/EFL \leq 6$.

7. An optical imaging lens comprising, in order from an object side to an image side, a first lens element, a second lens element, a third lens element, an aperture stop, a fourth lens element, a fifth lens element, a sixth lens element, and a seventh lens element arranged along an optical axis, each lens element having an object-side surface facing toward the object side and an image-side surface facing toward the image side, wherein:
the object-side surface of the first lens element has a convex portion in a vicinity of the optical axis and a convex portion in a vicinity of an outer circumference;
the second and fifth lens elements have a refractive power;
the object-side surface of the third lens element has a convex portion in the vicinity of the optical axis and a convex portion in the vicinity of the outer circumference;
the object-side surface of the fourth lens element has a concave portion in the vicinity of the optical axis;
the image-side surface of the sixth lens element has a convex portion in the vicinity of the outer circumference;
the object-side surface of the seventh lens element has a convex portion in the vicinity of the optical axis and image-side surface has a convex portion in the vicinity of the outer circumference;
the optical imaging lens only has seven lens elements having a refractive power; and
an effective focal length of the optical imaging lens is defined as EFL, an air gap between the first and second lens elements along the optical axis is defined as G12, and EFL and G12 satisfy the relation:

$EFL/G12 \leq 10$.

8. The optical imaging lens of claim 7, wherein a thickness of the fifth lens element along the optical axis is defined as T5 and a thickness of the sixth lens element along the optical axis is defined as T6, and wherein T5 and T6 satisfy the relation:

$T5/T6 \leq 4.0$.

9. The optical imaging lens of claim 7, wherein an air gap between the second and third lens elements along the optical axis is defined as G23 and an air gap between the sixth and seventh lens elements along the optical axis is defined as G67, and wherein G23 and G67 satisfy the relation:

$G23/G67 \leq 25$.

10. The optical imaging lens of claim 7, wherein a thickness of the first lens element along the optical axis is defined as T1 and a thickness of the second lens element along the optical axis is defined as T2, and wherein T1 and T2 satisfy the relation:

$T1/T2 \leq 2.5$.

11. The optical imaging lens of claim 7, wherein a sum of air gaps between the first lens element through the seventh lens element along the optical axis is defined as AAG and an air gap between the third and fourth lens elements is defined as G34, and wherein AAG and G34 satisfy the relation:

$AAG/G34 \leq 6$.

12. The optical imaging lens of claim 7, wherein a sum of thicknesses of the first, second, third, fourth, fifth, sixth, and seventh lens elements along the optical axis is defined as ALT and a sum of air gaps between the first lens element through the seventh lens element along the optical axis is defined as AAG, and wherein ALT and AAG satisfy the relation:

$ALT/AAG \leq 5$.

13. An optical imaging lens comprising, in order from an object side to an image side, a first lens element, a second lens element, a third lens element, a fourth lens element, a fifth lens element, a sixth lens element, and a seventh lens element arranged along an optical axis, each lens element having an object-side surface facing toward the object side and an image-side surface facing toward the image side, wherein:
the object-side surface of the first lens element has a convex portion in a vicinity of an outer circumference and the image-side surface has a concave portion in a vicinity of the optical axis;
the second and fifth lens elements have a refractive power;
the object-side surface of the third lens element has a convex portion in the vicinity of the optical axis and the image-side surface has a concave portion in the vicinity of the optical axis;
the fourth lens element has a positive refractive power and the image-side surface has a convex image-side surface in the vicinity of the optical axis;
the image-side surface of the sixth lens element has a convex portion in the vicinity of the optical axis and a convex portion in a vicinity of the outer circumference;
the image-side surface of the seventh lens element has a convex portion in the vicinity of the optical axis and a convex portion in a vicinity of the outer circumference;
the optical imaging lens only has seven lens elements having a refractive power; and
an air gap between the first and second lens elements along the optical axis is defined as G12, an air gap between the second and third lens elements along the optical axis is defined as G23, and G12 and G23 satisfy the relation:

$G12/G23 \leq 20$.

14. The optical imaging lens of claim 13, wherein a thickness of the sixth lens element along the optical axis is defined as T6, and wherein T6 and G23 satisfy the relation:

$T6/G23 \leq 25$.

15. The optical imaging lens of claim 13, wherein a thickness of the first lens element along the optical axis is defined as T1 and an air gap between the sixth and seventh lens elements along the optical axis is defined as G67, and wherein T1 and G67 satisfy the relation:

$T1/G67 \leq 30$.

16. The optical imaging lens of claim 13, wherein a thickness of the third lens element along the optical axis is defined as T3 and a thickness of the seventh lens element along the optical axis is defined as T7, and wherein T3 and T7 satisfy the relation:

$T3/T7 \leq 1.5$.

17. The optical imaging lens of claim 13, wherein a sum of air gaps between the first lens element through the seventh lens element along the optical axis is defined as AAG and an effective focal length of the optical imaging lens is defined as EFL, and wherein AAG and EFL satisfy the relation:

$AAG/EFL \leq 3.5$.

* * * * *